United States Patent
Suresh et al.

(10) Patent No.: US 10,970,125 B2
(45) Date of Patent: *Apr. 6, 2021

(54) DYNAMIC COMPUTE RESOURCE ASSIGNMENT AND SCALABLE COMPUTING ENVIRONMENT GENERATION FOR LIVE ENVIRONMENTS

(71) Applicant: Microsoft Technology Licensing, LLC, Redmond, WA (US)

(72) Inventors: Avinash Tiruchanapalli Suresh, Redmond, WA (US); Joey Beum Cho, Issaquah, WA (US); Jonathan Acone, Redmond, WA (US); Vivek Bapuji Dalvi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 279 days.

This patent is subject to a terminal disclaimer.

(21) Appl. No.: 16/029,534

(22) Filed: Jul. 6, 2018

(65) Prior Publication Data

US 2019/0370081 A1    Dec. 5, 2019

Related U.S. Application Data

(63) Continuation-in-part of application No. 15/995,117, filed on May 31, 2018.

(51) Int. Cl.
*G06F 9/455* (2018.01)
*G06F 9/50* (2006.01)
(Continued)

(52) U.S. Cl.
CPC ........ *G06F 9/5077* (2013.01); *G06F 9/45558* (2013.01); *G06F 21/53* (2013.01);
(Continued)

(58) Field of Classification Search
CPC .... G06F 21/53; G06F 9/45558; G06F 9/5077; G06F 2009/4557; G06F 2009/45587;
(Continued)

(56) References Cited

U.S. PATENT DOCUMENTS

| 8,756,598 B1* | 6/2014 | Costea | G06F 9/45558 |
| | | | 717/174 |
| 10,356,087 B1* | 7/2019 | Vetter | H04L 9/0863 |

(Continued)

FOREIGN PATENT DOCUMENTS

WO    2011025670 A1    3/2011

OTHER PUBLICATIONS

"International Search Report and Written Opinion Issued in PCT Application No. PCT/US2019/032544", dated Aug. 22, 2019, 18 Pages.

*Primary Examiner* — Bradley A Teets
(74) *Attorney, Agent, or Firm* — Watson Patents, PLC; Vladan M. Vasiljevic (57) ABSTRACT

Computing environments are scalably generated and provisioned based on metadata associated with separately defined containers of groups of sandboxes. Each container of a group of sandboxes is its own digital construct and is wrapped with metadata that defines the nature and aspects of the grouping, including enumerating individual members of a team, factors or attributes of assignments, and the like. The metadata, therefore, identifies the sandboxes to generate and, within those sandboxes, the computing environments to generate and how such computing environments are to be provisioned. In variable team settings quantities and identities of individuals can be unknown and can dynamically change. Administrators provide team definitions without rosters, or with rosters that comprise only previously registered individuals. Subsequently joining individuals are dynamically added to the roster and appropriate sandboxes (Continued)

and computing environments are generated at a different time than the sandboxes and computing environments were generated for other users.

20 Claims, 5 Drawing Sheets (51) Int. Cl.
G06F 21/53 (2013.01)
H04L 29/06 (2006.01)

(52) U.S. Cl.
CPC ...... H04L 63/10 (2013.01); *G06F 2009/4557* (2013.01); *G06F 2009/45587* (2013.01); *G06F 2009/45591* (2013.01); *G06F 2009/45595* (2013.01)

(58) Field of Classification Search
CPC . G06F 2009/45591; G06F 2009/45595; H04L 63/10

USPC ............................................................ 718/1
See application file for complete search history.

(56) References Cited

U.S. PATENT DOCUMENTS

| | | | |
|---|---|---|---|
| 2012/0226796 A1* | 9/2012 | Morgan | H04L 67/10 709/224 |
| 2013/0074064 A1 | 3/2013 | Das et al. | |
| 2013/0290954 A1 | 10/2013 | Dorland et al. | |
| 2014/0380312 A1* | 12/2014 | Ansel | G06F 21/53 718/1 |
| 2015/0235045 A1* | 8/2015 | Schmitt | G06F 16/21 707/784 |
| 2015/0365351 A1* | 12/2015 | Suit | G06F 8/60 709/226 |
| 2018/0011871 A1* | 1/2018 | Kroll | G06F 8/65 |
| 2019/0370458 A1* | 12/2019 | Cho | G06F 9/45558 |

* cited by examiner

DYNAMIC COMPUTE RESOURCE ASSIGNMENT AND SCALABLE COMPUTING ENVIRONMENT GENERATION FOR LIVE ENVIRONMENTS

CROSS-REFERENCE TO RELATED APPLICATION

This application is a continuation of U.S. patent application Ser. No. 15/995,117, filed on May 31, 2018 and entitled "SCALABLE COMPUTING ENVIRONMENT GENERATION AND COMPUTE RESOURCE ASSIGNMENT", the entire specification of which is hereby incorporated by reference.

BACKGROUND

Increasingly, a computing environment need not be supported by hardware that is physically co-located with a user utilizing such a computing environment, but rather can be supported by networked computing hardware aggregated into large data centers that are physically remote from the user. Often such computing environments are referred to as "cloud computing environments" and can provide users with different computing environments that are typically supported by virtual machines posted by large collections of computing hardware providing stability, redundancy, and high availability. Typically, the provisioning of computing environments, such as virtual machines, can be performed once, such as by an administrator, and the resulting provisioned computing environments can then be provided to users to utilize, with such utilization of compute resources being invoiced in an ongoing manner. Often, the generation and provisioning of computing environments can be tedious and time-consuming, even for skilled administrators, especially if the quantity of such computing environments to be generated is high.

In variable team settings, there can be a need for the generation of, and provisioning of, multiple computing environments on a repeated basis. For example, a team comprised of multiple different individuals, who may or may not be known in advance, needs to have multiple computing environments provisioned for each such individual in accordance with multiple different tasks, or projects, that the individual members of such a team are to perform. Often, such situations arise in presentational and/or educational contexts. As one example, a computer science professor can seek to educate one of his classes in implementing functionality with a database application, while another of his classes can be educated in programming with a specific set of application development tools. In such an example, the professor would be required to establish one set of computing environments for each individual in the class directed to implementing functionality with a database application, and would then be further required to establish another set of computing environments for each individual in the class directed to programming with the specific set of application development tools. Should the first class then subsequently be assigned a project directed to an image editing application, the professor could again be required to establish an entirely different set of computing environments for each individual in that class. If such classes comprise tens or hundreds of students, the quantity of computing environments to be established can quickly become untenable. As another example, a presenter, such as at a conference, may seek to provide attendees with access to a specific computing environment as part of the presentation. However, the specific individuals, and, indeed, the overall quantity of individuals, can both be unknown and can dynamically change prior to, and even during, the presentation. In such an example, the presenter would be required to have each individual attendee participate in the multistep process of generating their own computing environments, causing confusion among attendees and rendering the entire presentation less efficient and less useful. Additionally, requiring each attendee to participate in the multistep process of generating their own computing environments distracts the attendees and delays the presentation of useful material by the presenter.

Moreover, resource consumption limits can further complicate the professor's or presenter's difficulties, since, often, such professors may not be able to obtain additional resource consumption credits or presenters may not know how much resource consumption will be required. In particular, while resource consumption limitations can be established through a single administrator, such as the professor or presenter in the above examples, typical cloud computing environments are invoiced separately, thereby requiring resource consumption limitations to be manually divided or allocated among the multiple different computing environments that were provisioned. The distribution of such resource consumption limitations can further exacerbate the impossibility of manually establishing computing environments in such team settings.

SUMMARY

Computing environments can be scalably generated and provisioned based on metadata associated with separately defined containers of groups of sandboxes. Each container of a group of sandboxes can be its own digital construct and can be wrapped with metadata that defines the nature and aspects of the grouping, including enumerating individual members of a team, factors or attributes of assignments, and the like. The metadata, therefore, can identify the sandboxes to generate and, within those sandboxes, the computing environments to generate and how such computing environments are to be provisioned. The sandboxes can be generated in parallel and the computing environments can be provisioned in parallel, or staggered based on individual user access. Additionally, as the relevant metadata is changed, already-created computing environments and sandboxes can be modified or deleted and new computing environments and sandboxes can be generated. Assignment of consumption limitations can be individually assigned based on predetermined quantities or based on quantities determined based on changing factors, such as a quantity of individual sandboxes currently in a container. The container construct then provides for the monitoring and adjustment of such consumption limitations on an aggregated basis.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to the scalable generation and provisioning of sandboxes for individual users and computing environments usable by such users within those sandboxes. Such sandboxes and computing environments can be scalably generated and provisioned based on metadata associated with separately defined containers of groups of sandboxes. Each container of a group of sandboxes can be its own digital construct and can be wrapped with metadata that defines the nature and aspects of the grouping, including enumerating individual members of a team, factors or attributes of assignments, and the like. The metadata, therefore, can identify the sandboxes to generate and, within those sandboxes, the computing environments to generate and how such computing environments are to be provisioned. The sandboxes can be generated in parallel and the computing environments can be provisioned in parallel, or staggered based on individual user access. Additionally, as the relevant metadata is changed, already-created computing environments and sandboxes can be modified or deleted and new computing environments and sandboxes can be generated. Assignment of consumption limitations can be individually assigned based on predetermined quantities or based on quantities determined based on changing factors, such as a quantity of individual sandboxes currently in a container. The container construct then provides for the monitoring and adjustment of such consumption limitations on an aggregated basis.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including servers, hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Figure 1:
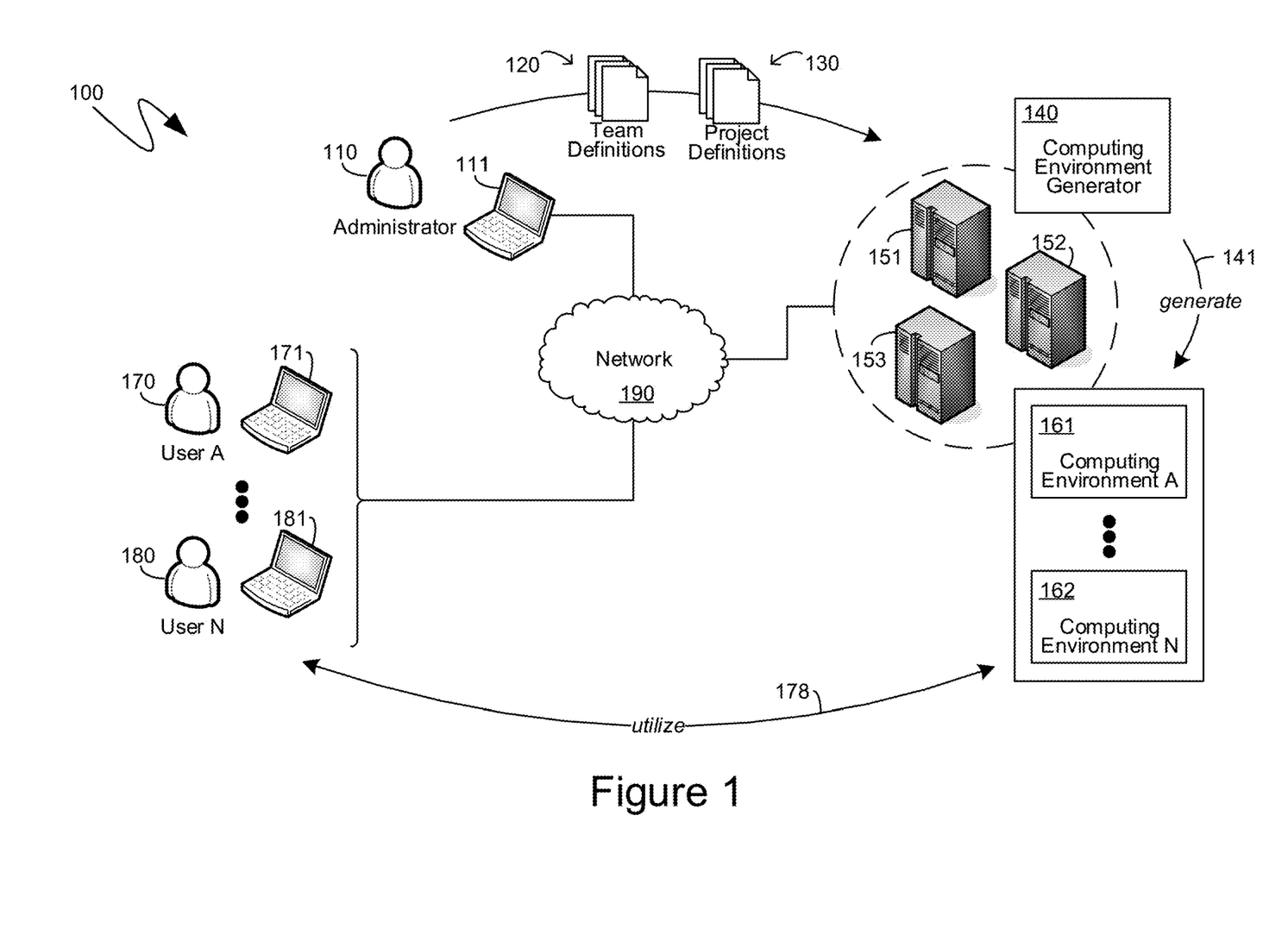
FIG. 1 is a system diagram of an exemplary system providing for computing environment generation.

With reference to FIG. 1, an exemplary system 100 is illustrated, providing context for the descriptions below. An administrator, such as the exemplary administrator 110, can provide one or more team definitions, such as the exemplary team definitions 120, and one or more project definitions, such as the exemplary project definitions 130 to a computing environment generator, such as the exemplary computing environment generator 140. For purposes of illustrating the underlying computing hardware context, the administrator 110 can utilize a computing device, such as the exemplary personal computing device 111, which can be communicationally coupled to one or more server computing devices, such as the exemplary server computing devices 151, 152 and 153, via a computer communication network, such as the exemplary network 190.

According to one aspect, a team definition, such as one of the team definitions 120, can comprise identifying information, such as a name, as well as information relevant to establishing compute resource projects and limitations. For example, a team definition can comprise an indication of a quantity of compute resources, expressed in any appropriate compute resource metric. For example, a team definition can comprise an enumeration of compute resources in terms of a quantity of processor hours, dollars, memory consumption, or other like quantification of compute resources. Compute resources, therefore, are consumed, or accounted for, as a computing environment performs computations or other like computer processing. Such compute resources can have been assigned to the administrator 110, who can be a professor of a class, through a grant or other like resource assignment mechanism. Alternatively, or in addition, such compute resources can be been made available to the administrator 110, who can be a presenter of a talk or conference seminar or lab, on an as-needed or dynamic basis. Consequently, according to one aspect, compute resources can be enumerated in terms of a limit, such as a grant limit, or a per-user limit, that can be exhausted once all such compute resources are used up, or otherwise consumed by the execution of computations on the computing environments, thereby resulting in the termination of further compute functionality.

A team definition can also comprise a roster or listing of individuals that are part of the team. Such individuals can be enumerated initially, such as part of an initial team definition, including one of the team definitions 120 illustrated in FIG. 1. Alternatively, or in addition, individuals can join a team at subsequent times, such as through mechanisms which will be described in detail below.

In addition to the exemplary team definitions 120, and administrator, such as the exemplary administrator 110, can provide one or more project definitions, such as the exemplary project definitions 130. According to one aspect, project definitions can comprise information indicative of the computing environment that is to be generated, as well as identifying information, such as a name of the project, and also instructions or other foundational materials relevant to the initiation, performance or completion of the project. For example, a project directed to database operations can have a project definition associated with it that identifies the computing environment that is to be generated for such a project as comprising a processor of a given type, speed, or other like processor-indicative attributes, a quantity of memory, a quantity of storage capacity, and relevant application programs, such as the database application. Each individual performing such a project can, thereby, be provided with a computing environment that is tailored to such a project, such as would have been designed by a professor teaching a class. Additionally, a project directed to database operations can include a manual, syllabus, instructions, or other like information that can be provided, such as by the professor teaching the class on database operations.

Upon receipt of team and project definitions, such as the exemplary team definitions 120 and project definitions 130, a computing environment generator, such as the exemplary computing environment generator 140, can generate multiple computing environments, such as the exemplary computing environments 161 and 162, as illustrated by the generate action 141. More specifically, according to one aspect, the computing environment generator can generate a computing environment for each project for each currently enumerated team member. Thus, for example, if one of the team definitions 120 enumerated ten entities as being part of a given team, and two of the project definitions 130 indicated that they were assigned to that team, then the computing environment generator 140 can generate twenty computing environments, one for each member of the ten-member team that corresponds to the first project, and another for each member of that same ten-member team that corresponds to the second project. According to another aspect, one or more computing environments can be generated by the computing environment generator 140 in advance, such as to be subsequently associated with individual users when such users join one or more of the teams defined by the exemplary team definitions 120. Additionally, the computing environment generator 140 can perform the generate action 141 multiple times, based upon the relevant metadata at the time the generate action 141 is performed. For example, if a team definition enumerated five team members, and only a single project definition identified the team, the exemplary computing environment generator 140 could generate five computing environments. Continuing with such an example, if the team was subsequently to include a sixth individual, the computing environment generator 140 could, at that subsequent time, generate another, sixth, computing environment. Alternatively, or in addition, generate action 141 can be scheduled for predetermined times. For example, if a team definition enumerated five team members, and only a single project definition identified the team, exemplary computing environment generator 140 could delay generating five computing environments until a subsequent, specified time. If, prior to such a time, a sixth individual joins the team, then the computing environment generator 140 can continue to delay the generation of computing environments until the scheduled time, but, at the scheduled time, can generate all six computing environments at the same time. According to yet another aspect, the computing environment generator 140 can determine which computing environments need to be generated, but can delay the generation of such computing environments pending a subsequent action, such as a user acceptance of an invite.

The computing environment generator can assign limitations, or other like controls directed to compute resource consumption by such computing environments. To provide security and control over such computing environments, the computing environment generator, such as the exemplary computing environment generator 140, can establish administrative and security policies, such as identifying individual users to whom user access to such computing environments will be granted, while also identifying an administrator, such as the exemplary ministry 110, as having administrative privileges to such environments including, for example, the ability to modify the parameters or resources of such environments, as well as other administrative controls.

According to one aspect, the generated computing environments, such as the exemplary computing environments 161 and 162, can be virtual machines hosted by one or more of the computing devices 151, 152 and 153. Such virtual machines can present a virtualized computing environment that, through hypervisors and other like mechanisms, is, ultimately, supported by the hardware and software of the host computing devices, such as the exemplary computing devices 151, 152 and 153. According to one aspect, the computing devices 151, 152 and 153 can be datacenter-based server computing devices that can provide redundant and parallelized hardware and software for the hosting of remotely-accessible computing services, such as cloud computing services. Such services can include the hosting of virtual machines or other like computing environments. Users of such a hosting service, such as the exemplary users 170 and 180, can have an account, or other like construct, through which their ability to access the hosting service, and utilize its hardware and software capabilities is controlled. Typically, such accounts are in the form of subscriptions that enumerate the temporal, computational and other like limitations of a user's access to the hardware and software of the hosting service. As utilized herein, the term "sandbox" means a subscription or other like enumeration of temporal, computational or other like abilities provided for, or limitations expressed on, a user's utilization of a computationally-based hosting service. While the precise hierarchy of sandboxes and the computing environments, hosted by a hosting service, accessible thereby, can be orthogonal to the descriptions herein, as will be detailed below, reference to the generation of computing environment, such as the generation of the exemplary computing environments 161 and 162 by the exemplary computing environment generator 140 can include the generation of one or more sandboxes through which such computing environments can be accessed and utilized as hosted by, and executed on, the hardware and software of a hosting service, such as the hardware graphically represented by the computing devices 151, 152 and 153 illustrated in FIG. 1.

In addition to generating computing environments, the exemplary computing environment generator 140 can further generate digital constructs that can be linked to the computing environments, thereby facilitating the management thereof. For example, for each of the team definitions 120, a team can be created by the computing environment generator 140, where the term "team" as utilized herein, means a digital construct that is a collection of user identities and with which metadata can be associated to link additional information thereto. For example, team metadata can comprise an identifier for the team, such as a team name, and compute resource limitations or availabilities that are applicable to the team.

In a like manner, the computing environment generator 140 can generate, for each of the project definitions 130, projects, where the term "project" as utilized herein means a digital construct that serves to record metadata, such as identifying information, instructional materials, templates defining attributes of the computing environments, compute resource limitations, and other like metadata. Once the computing environment generator 140 generates one or more teams and one or more projects, the computing environment generator 140 can link specific projects to specific teams. Additionally, the computing environment generator 140 can link the generated computing environments, such as the exemplary computing environments 161 and 162, to the project for which such computing environments were generated. Individual users, such as the exemplary individual users 170 and 180 can utilize computing devices, such as the exemplary computing devices 171 and 181, to access the computing environments that were generated by the computing environment generator 140, such as the exemplary computing environments 161 and 162. More specifically, the exemplary computing devices 171 and 181 can be communicationally coupled to one or more server computing devices, such as the exemplary server computing devices 151, 152 and 153, through a computer communication network, such as the exemplary network 190. As illustrated by the utilize action 178 in FIG. 1, the users, such as the exemplary users 170 and 180, can utilize computing environments generated by the computing environment generator 140, such as the exemplary computing environments 161 and 162, to perform the projects and consume compute resources in the process.

Figure 2:
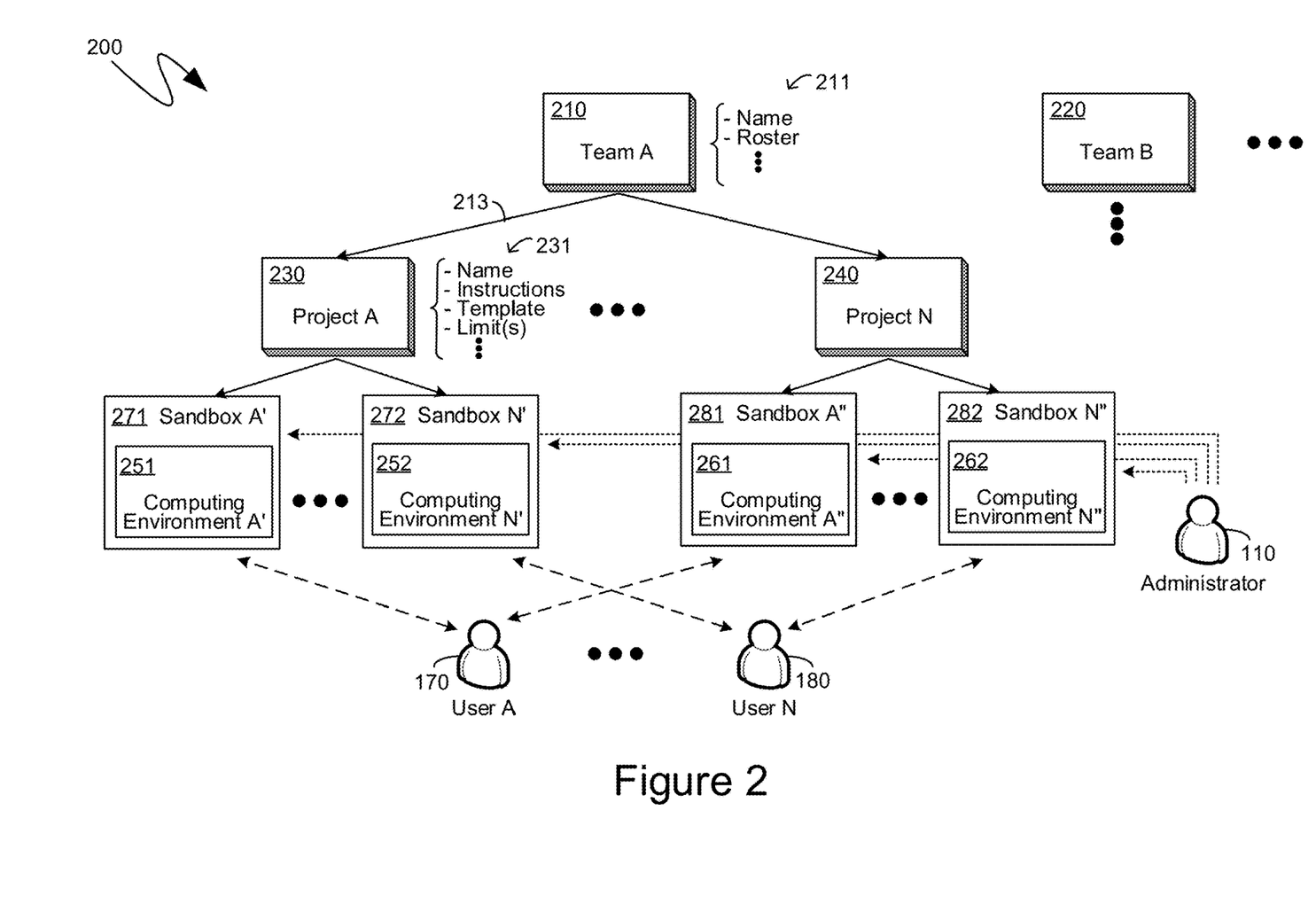
FIG. 2 is a system diagram of an exemplary system providing scalable computing environment generation.

Turning to FIG. 2, the exemplary system 200 shown therein illustrates an exemplary linkage between computing environments, sandboxes, projects and teams. Teams, such as the exemplary teams 210 and 220, and projects, such as the exemplary projects 230 and 240, can be generated based on information received from team and project definitions. For example, the exemplary team 210 can comprise a wrapper that can include metadata indicative of the name of the team, a roster of individuals, in the form of user identities, that comprise the team 210, and other like information. Similarly, the exemplary project 230 can comprise a wrapper that can include metadata indicative of the name of a project, instructions or other like resources applicable to initiating, performing or completing the project, compute resource limitations associated with the project, a computing environment template defining a computing environment on which the project is to be performed, and other like metadata. Additionally, the project 230 can be assigned to the team 210. Accordingly, a linkage can be made, as illustrated by the arrow 213, between the project 230 and the team 210.

The exemplary system 200, shown in FIG. 2, illustrates multiple projects being assigned to the team 210, including, for example, the project 230 and the project 240. According to one example, such projects can be representative of homework projects, or school work projects, assigned to the students of the class, where the team 210 represents that class.

Additional linkages can be formed between individual computing environments and the project to which they correspond. For example, the project 230 can have specified, and can have included as part of the metadata 231, a computing environment definition template. As indicated previously, such a template can comprise an identification of a quantity, type, speed, and other like defining attributes of processors that are to be emulated or represented within such a computing environment. As also indicated previously, such a template can comprise an identification of a quantity of memory, storage capacity, and other like computing environment attributes. Additionally, such a template can comprise an identification of the types of computer software, such as operating systems and application programs that are to be installed on the computing environment. Multiple computing environments, such as the exemplary computing environments 251 and 252, can be created based upon a computing environment definition template, which can be one of the templates enumerated in the metadata 231. According to one aspect, one computing environment can be generated for each individual enumerated in the roster of the team 210 to which the project 230, for which such computing environments are being generated, is linked. In a like manner, computing environments 261 and 262 can be generated.

The generated computing environments, such as the exemplary computing environments 251, 252, 261 and 262, can be in the form of virtual machines hosted by a service that provides the hardware and software to support the hosting of such virtual machines. In such an instance, the generation of an individual computing environment, such as the generation of an individual virtual machine image and the subsequent loading of such a virtual machine image with virtualization software, including a hypervisor or other like virtualization software, can be one part of the afore-described generation of a computing environment. Another part can be the generation of a sandbox, such as a subscription, account, or other like construct, within the context of the hosting service itself that can provide a mechanism through which the user can access and utilize the computing environments. For example, such a sandbox can provide a mechanism by which access to the service is limited or tracked. Thus, the generation of a computing environment can entail the generation of a sandbox within which that computing environment will be accessed.

A sandbox, such as the exemplary sandbox 271, can also be generated based on a template, such as a sandbox template, that can be one of the templates of the metadata 231 associated with the project 230. A sandbox template can specify aspects of a sandbox, such as type of account or subscription, pre-established limitations placed upon, or abilities granted to, such an account or subscription, and other like definitional or attributional aspects.

Once generated, security and administrative boundaries can be established for the computing environments and the sandboxes containing such computing environments. For example, the computing environment 251 can be accessed by a user, such as the exemplary user 170, through a sandbox, such as the exemplary sandbox 271, which can represent a security and administrative boundary that enables the computing environment 251 to be accessed by the user 170 but not, for example, by the user 180. In other words, the computing environment 251, and the sandbox 271, can be associated with a specific user, such as the exemplary user 170, such that the user 170 can access the sandbox 271 and utilize the computing environment 251, to the exclusion of other users, such as the exemplary user 180. In a similar manner, the computing environment 261, corresponding to a different project, can also be accessed by the user 170 but not, for example, by the user 180. Conversely, computing environments 252 and 262 can be accessed by the user 180, to the exclusion of the user 170.

According to one aspect, such multiple computing environments can be presented to users through an appropriate graphical user interface, such as an account or subscription graphical user interface that can graphically represent, to a given user, all of the computing environments available to such a user. Such a graphical user interface can additionally present information from the team or project to which a user's sandbox is linked. For example, the user 170, upon accessing the sandbox 271, can be provided with a graphical user interface that displays, not only a mechanism by which the user 170 can access the computing environment 251, but also information about the project 230, such as, for example, the project name, project instructions, manuals, notes and other like informational material, and other aspects that can be part of the metadata 231 of the project 230. Additionally, the user 170 can, analogously, be provided with information obtained from the metadata 211 associated with the team 210, such as, for example, the team name.

As indicated previously, a sandbox can be in the form of an account or subscription. Accordingly, each individual user may be uniquely associated with only a single sandbox, and can, from within that single sandbox, access multiple different computing environments. For example, the sandboxes 271 and 281 can both be a single sandbox associated with the exemplary user 170, and, in a similar manner, the sandboxes 272 and 282 can, likewise, both be a single sandbox that is associated with the exemplary user 180. In such an embodiment, a user, such as exemplary user 170, upon accessing their sandbox, can be presented, such as through the aforedescribed graphical user interface, multiple different computing environments that the user can be allowed to access. For example, the exemplary user 170 could be presented with both the computing environment 251 and the computing environment 261. As indicated previously, the graphical user interface could further indicate that the computing environment 251 is associated with the project 230, including, for example, providing a project name or other like identifier, and could likewise indicate that the computing environment 261 is associated with the project 240, both of which can have been assigned to the user 170 as part of the user being a member of the team 210, such as, for example, the user 170 being part of an educational class whose students are enumerated as the team 210. In a like manner, the user 180 can, upon accessing a single sandbox, again, being a combination of the separately illustrated sandboxes 272 and 282, be presented with a graphical user interface that allows the user 180 to select the computing environment 252, the computing environment 262, and any other computing environments within that single sandbox.

To facilitate management and administration of computing environments, each of the computing environments 251, 252, 261 and 262, and the sandboxes within the context of which such computing environments are accessed, such as the exemplary sandboxes 271, 272, 281 and 282, can also be associated with administrative privileges that can be granted to one or more users. In the specific example illustrated by the system 200 of FIG. 2, the administrator 110 is shown as having such had such administrative access granted to them. As indicated previously, the administrator 110 can be a professor of the class that is assigning the projects to the individual students of the class. The administrator 110 can also be provided with a monitoring dashboard or other like user interface through which the administrator 110 can be presented with a current status as to the acceptance, such as by the users 170 and 180 of invitations, the creation of various sandboxes and the creation of various computing environments. Such a user interface can provide details regarding individual sandbox and computing environment creation, as well as aggregated information, such as detailed below.

According to one aspect, the consumption of compute resources can be accounted for at the individual computing environment or sandbox level. Consequently, compute resources assigned on a team basis, or project basis, can be distributed among the various computing environments being created that are contained within a team container or project container. For example, compute resource limitations or availability can be equally distributed among all of the computing environments to which such limitations or availability apply. For example, compute resource limitations enumerated in the metadata 231, and applicable to the project 230, can be replicated among the computing environments 251 and 252. According to one aspect, however, such a default project can be manually changed, such as by an administrator, such as the exemplary administrator 110, either at the time that the computing environments, such as the exemplary computing environments 251 and 252, are generated, or at a subsequent time.

The allocation of compute resources, and the subsequent monitoring of the consumption or utilization thereof, can be performed in a hierarchical manner. Thus, for example, compute resources can be allocated to the team 210, and can be enumerated in the metadata 211 associated with the team 210. A portion of such compute resources can then be allocated to each of the project 230 and 240, as well as any other projects assigned to the team 210. Such a portion can be an equal portion, with, for example, each of the project 230 and 240 being assigned half of the compute resources assigned to the team 210. Alternatively, such a portion can be dissimilar. Additionally, some amount of compute resources can be retained, such as at the team level, for future projects, or for future allocation to existing projects, such as the exemplary projects 230 and 240. Continuing with the hierarchical example, the portion of compute resources assigned to each project, such as from the team level, can then be further distributed among the computing environments linked to such a project. Thus, the portion of the compute resources assigned to the project 230, from the team 210, can be further distributed among the computing environments 251 and 252, such as in the manner detailed above. Mechanisms for distributed compute resources among any hierarchical level can be equally applied to any other hierarchical level.

According to another aspect, the allocation of compute resources can be performed on a per-user or per-sandbox level, in which case an aggregate quantity of compute resources can be unbounded so long as additional users are allowed to join one or more teams, as will be detailed further below with reference to FIG. 3.

Compute resource limitations can also include enumeration of one or more allowed or constrained services. For example, the computing environments 251 and 252 can be constrained to prevent the execution of specific, enumerated software packages. Conversely, or in addition, the computing environments 251 and 252 can be constrained to only allow the execution of specific, enumerated services, or can be explicitly allowed to have access to specific services, irrespective of other limitations.

The monitoring of the consumption of such compute resources can then also be aggregated at the project and team levels, as appropriate. For example, the consumption of compute resources by the users 170 and 180, in utilizing the computing environments 251 and 252, respectively, can be aggregated and compared against compute resource limitations enumerated in the metadata 231 associated with the project 230. In a similar manner, if compute resource limitations or available quantity was enumerated on a team-wide basis, then the compute resource consumption of the individual computing environments can be aggregated at the project level, and then such aggregation can be further aggregated at the team level.

Figure 3:
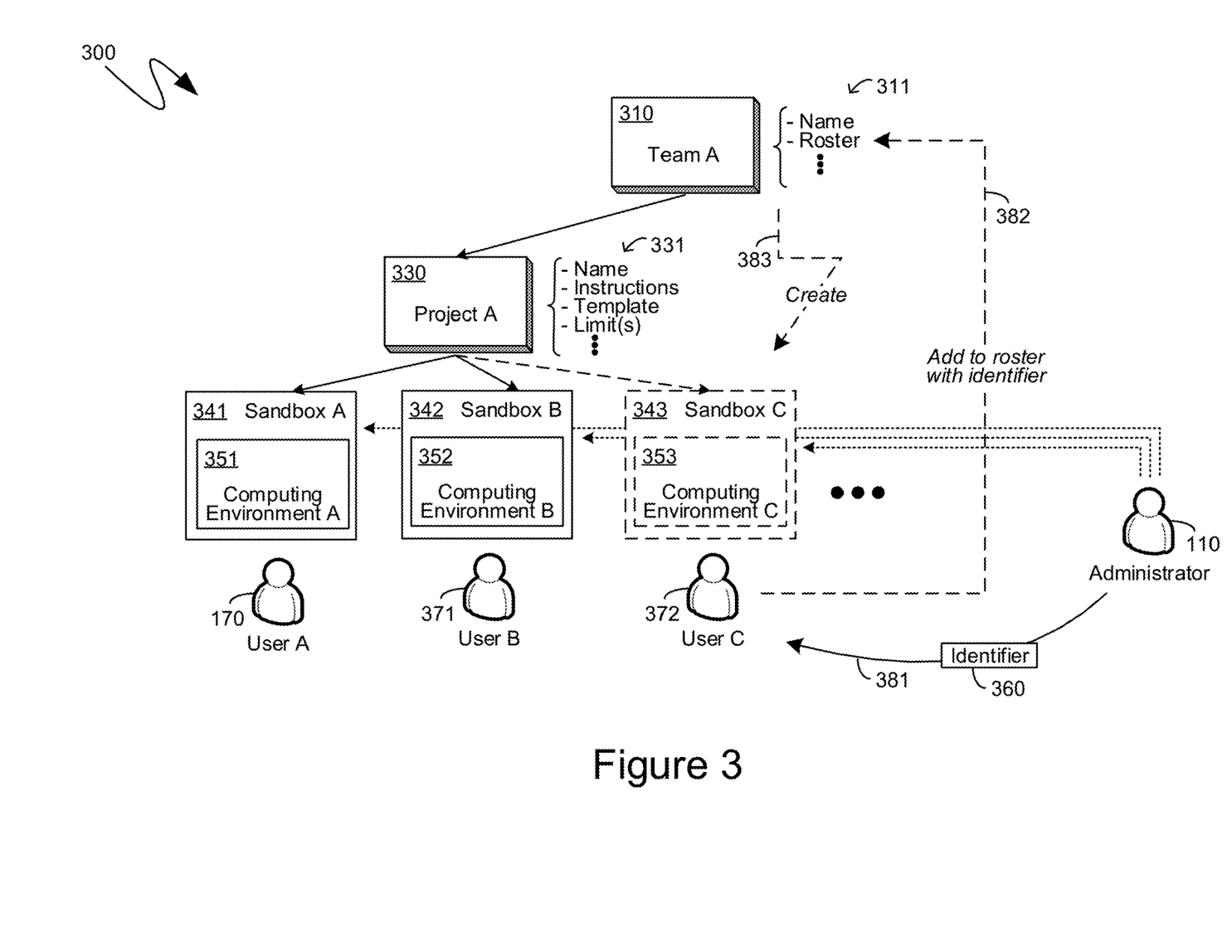
FIG. 3 is a system diagram of exemplary system providing updatable computing environment generation.

Turning to FIG. 3, the exemplary system 300 shown therein illustrates an exemplary extending of an existing team, such as exemplary team 310, with a new user, such as the exemplary user 372. More specifically, an administrator, such as the exemplary administrator 110, can have provided one or more team definitions and one or more project definitions that can result in the creation of one or more team containers, such as the exemplary team 310, and one or more project containers, such as exemplary project 330. For example, the exemplary administrator 110 can be a presenter at a conference. Thus, while the exemplary administrator 110 may be capable of establishing templates for computing environments to be utilized by the attendees of their conference, the exemplary administrator 110 may not be aware of exactly how many attendees will be present. For example, the conference may not require attendees to register in advance, or may allow attendees to freely move between presentations. In such an instance, an administrator can provide a team definition that does not include a roster, or includes a roster that comprises only those individuals that have registered previously. Subsequently joining individuals can then be dynamically added to the roster and appropriate sandboxes and computing environments can be generated for them at a different time than the sandboxes and computing environments were generated for other users.

For example, in the example illustrated by the system 300 of FIG. 3, sandboxes 341 and 342 can have been created for the users 170 and 371 in the manner detailed above. Additionally, computing environments, such as exemplary computing environments 351 and 352 can have been generated and can be accessible within the sandboxes 341 and 342, respectively, such as, based upon templates or other like metadata associated with the project 330, such as in a manner that was also detailed previously. As part of the creation of the team 310, an administrator, such as exemplary administrator 110, can be provided with an identifier, such as the exemplary identifier 360, which can be system generated and can uniquely identify the team 310 and otherwise enable processes to update the metadata of the team 310, such as, for example, update the roster of the team 310 to include new members. More specifically, the administrator 110 can share the identifier 360 with other users that may be interested in joining the team 310. For example, the administrator 110 can provide the identifier 360 to all of the participants at a conference, to enable those participants to join the presentation that the administrator 110 is making at that conference.

As illustrated in the exemplary system 300 of FIG. 3, users, such as the exemplary user 372, can receive the identifier 360, such as through a distribution action 381 triggered by the administrator 110. Such an identifier can then be provided to computer-executable instructions that can utilize the identifier to add a user, such as exemplary user 372, to a team, such as the exemplary team 310. For example, the exemplary user 372 can provide the identifier 360 to a webpage that can act as a front-end for processes that can accept such an identifier and then utilize it to add the user 372 to the roster of the team 310.

As illustrated by the actions 382 and 383, once the metadata of the team 310 is modified to include an updated roster, subsequent processing can generate new sandboxes and/or new computing environments to account for the changes in the metadata of the team 310. For example, once the action 382 updates the metadata of the team at 310 to include the user 372 in the roster, a creation action 383 can be triggered to create a sandbox 343 that can be associated with the user 372, and, a computing environment 353 can be generated and made available to the user 372 via the sandbox 343, with the computing environment 353 conforming to the template and other like information that can be part of the metadata of the project 330, which, in the present example, can represent the presentation that the presenter, in the form of the administrator 110, is presenting at the conference.

As indicated previously, the creation action 383 need not be triggered by the modification of the metadata of the team 310, such as by the addition of the user 372 to the roster of the team 310, is illustrated by the action 382. For example, the creation action 383 can be scheduled, or triggered based upon a current time matching a predetermined time, as opposed to being triggered by the modification of the metadata of the team 310. In such an example, any users added to the roster of the team 310 since the last time the create action 383 was executed can have sandboxes and/or computing environments created for them at a subsequent execution of the create action 383. For example, the administrator 110 can trigger the creation of the sandboxes 341 and 342, and the computing environments 351 and 352 for users that signed up for the administrator's conference presentation in advance. The administrator 110 can then further specify that any other users who seek to attend the presentation must do so no later than ten minutes prior to the start of the presentation. At ten minutes prior to the start of the presentation, the create action 383 can identify any additional users who have been added to the roster of the team 310 since the time when the initial sandboxes 341 and 342 and initial computing environments 351 and 352 were created. Such a create action 383 can identify the user 372 as having been added to the roster of the team 310 since that time and, at ten minutes prior to the start of the presentation, the create action 383 can create the sandbox 343 and the computing environment 353, thereby allowing the user 372 to access a computing environment designed by the presenter of the presentation. Alternatively, the creation of all of the sandboxes and computing environments can be triggered at one or more predetermined times. More specifically, the administrator 110 need not have triggered the creation of the sandboxes 341 and 342, and the computing environments 351 and 352, for users that signed up for the administrator's conference presentation in advance at the time that the administrator provided the relevant team and project definitions, but rather the creation of the sandboxes 341 and 342, and the computing environments 351 and 352, can have been performed at the same time as the creation of the sandbox 343 in the computing environment 353, namely, for example, ten minutes prior to the start of the presentation. In yet another aspect, a check for new users may not needed and new users can get added to the system on an ad-hoc basis.

The creation of sandboxes and computing environments can be triggered independently of one another. For example, because the creation of computing environments can be time-consuming, the creation of such computing environments can be delayed in situations such as those illustrated by the exemplary system 200 of FIG. 2. For example, and returning to FIG. 2, a professor, in the form of the administrator 110, can provide the relevant team and project definitions that can enable the creation of the team container 210 in project containers 230 and 240. In turn, the sandboxes 371, 372, 381 and 382 can be created, such as in the manner detailed previously. The users, such as exemplary users 170 and 180, may not access those sandboxes until a much later point in time. For example, a professor, in the form of the administrator 110, can provide the relevant information days, weeks, or even months prior to the start of a class. Furthermore, individual users may log on at various different times, with some users logging on days before class starts, other users logging on at the time of the first meeting of that class, and still other users logging on well afterwards. Accordingly, to distribute the processing load incurred in creating computing environments, the creation of the computing environments, such as the exemplary computing environments 251, 252, 261 and 262 can, according to one aspect, be delayed until a user actually logs on and seeks to utilize such a computing environment. Thus, for example, if the user 170 logs on the night before the class starts, the exemplary computing environments 251 and 261 can be generated at that time, while the generation of the computing environments 252 and 262 can be delayed until a subsequent time when the user 180 logs on, such as, for example, just a few minutes before the class starts, or even after the class has already started. In such a manner, the creation of the computing environments can be time shifted in distributed across time, thereby reducing the processing load at any one point in time.

As another example, the creation of computing environments can be accelerated forward in situations such as those illustrated by the exemplary system 300 of FIG. 3. For example, and returning to FIG. 3, a conference presenter, in the form of the administrator 110, can be uncertain as to how many users will attend their presentation. However, the conference presenter can anticipate that, for example, twenty users will attend the presentation. Accordingly, rather than waiting for users to join, the administrator 110 can trigger the creation of a holding sandbox that can be on associated with any specific user, other than the administrator 110 themselves, for example. Such a holding sandbox can then have created within it twenty computing environments, such as computing environments conforming to the template for other like metadata of the project 330. As individual users are added to the roster of the team 310, such as by the addition action 382, a new sandbox can be created for those users, again, either at the time that the users are added to the roster, or at a predetermined time. Once such a new sandbox is created, computing environments from the holding sandbox can be reassigned to the newly created sandbox, thereby time shifting the processing load of creating such computing environments into the past, and allowing users to more quickly access such computing environments after being added to the roster. Thus, for example, the computing environment 353 can have been created previously and can have been assigned to a holding sandbox. Upon the creation of the sandbox 343, as illustrated by the create action 383, the computing environment 353 can simply be reassigned to the sandbox 343, from the holding sandbox, which can be substantially faster and more efficient than creating a whole new computing environment within the sandbox 343.

As indicated previously, to facilitate management and administration of computing environments, each of the computing environments 351, 352, and 353, and the sandboxes within the context of which such computing environments are accessed, such as the exemplary sandboxes 341, 342 and 343, can also be associated with administrative privileges that can be granted to one or more users. In the specific example illustrated by the system 300 of FIG. 3, the administrator 110 is shown as having such had such administrative access granted to them. The administrator 110 can also be provided with a monitoring dashboard or other like user interface through which the administrator 110 can be presented with a current status as to the acceptance, such as by the users 170, 371 and/or 372 of invitations, the creation of various sandboxes and the creation of various computing environments. Such a user interface can provide details regarding individual sandbox and computing environment creation, as well as aggregated information.

Figure 4:
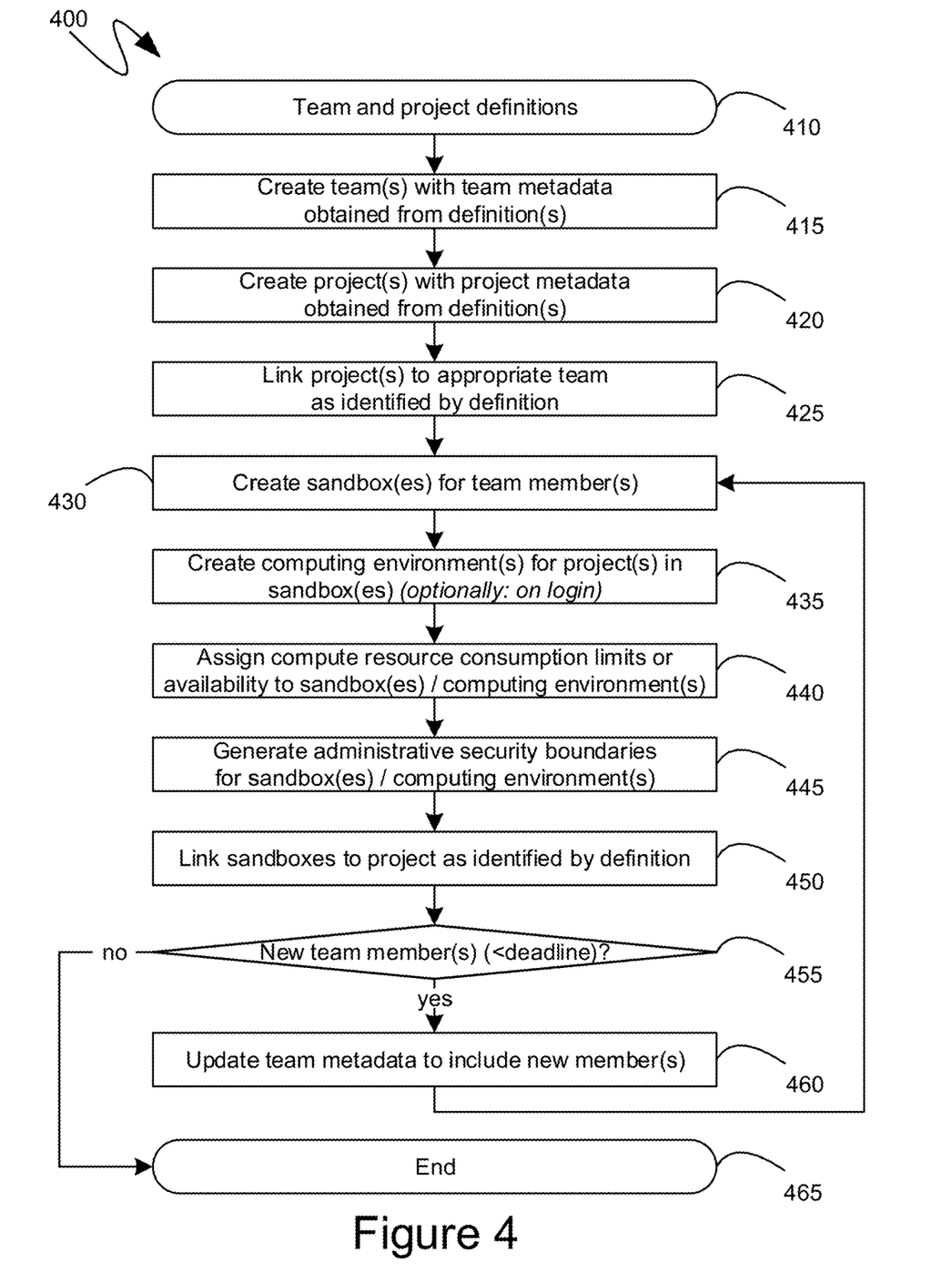
FIG. 4 is a flow diagram of an exemplary computing environment generation and provisioning mechanism.

Turning to FIG. 4, the flow diagram 400 shown therein illustrates an exemplary series of steps by which computing environments can be created at scale. Initially, at step 410, team and project definitions can be received. As indicated previously, such definitions can include team rosters, project computing resource templates, and other like information details above. Subsequently, at steps 415 and 420, teams and projects, from the definitions received at step 410, can be generated and metadata comprising information enumerated in such definitions can be wrapped around such teams and projects. At step 425 a linking between projects corresponding to teams to which such projects are assigned can be made.

At step 430, one or more sandboxes can be created for those users listed in the team roster or otherwise identified by the team or project metadata received at steps 415 and 420, respectively. As indicated previously, step 430 can be triggered by various events, such as a user acceptance, a specific time, and the like. At step 435, one or more computing environments can be generated for within the sandboxes created at step 430, such as in the manner detailed above. As indicated previously, the creation of a virtual machine, for example, can be a time-consuming process, and, accordingly, aspects of step 435 can be performed in parallel, or in a staggered manner. As to the latter, according to one aspect, as detailed above, the creation of a virtual machine image can be triggered by a user attempting to log into their account, or otherwise access the sandbox associated with such a user. In such an instance, the user will be able to access the computing environment, within the context of the sandbox, once the on-demand creation of the computing environment completes. As also detailed above, aspects of step 435 can be shifted ahead of step 430, such as in the instance where computing environments are generated and held in a holding sandbox until assigned to the one or more sandboxes created at step 430.

Once the sandboxes and computing environments are created, processing can proceed to step 440 and compute resource limitations or availability can be established for each individual sandbox and computing environment created at step 350. As indicated previously, step 440 can entail an initial distribution, such as an equal distribution across each computing environment associated with either a project, where such compute resource availability or limitation is defined at a project level, or each computing environment associated with a team, where such compute resource availability or limitation is defined at a team level. Step 440 can also entail the provision of each sandbox with a predetermined quantity of compute resources. For example, in a conference setting, each participant can have a predetermined quantity of compute resources irrespective of how many other participants join the presentation. As part of step 440, however, a default distribution can be modified, such as by an administrator, either in advance, in which case such modifications could be applied at step 440, or subsequently, in which case such modifications would not be part of the initial performance of the steps of the exemplary flow diagram 400.

Subsequently, at step 445, administrative and security boundaries can be generated for each sandbox and computing environment generated at steps 430 and 435. Such boundaries can include defining individual users that will have user access to such computing environments, within the context of such sandboxes, and defining administrative access to such computing environments. As indicated previously, users having access to multiple computing environments can be presented with such multiple computing environments through an account graphical user interface or other like unified access mechanism. At step 450, a link can be created between the individual computing environments and the project sandbox corresponding to the project for which such computing environments were created.

As detailed above, modifications can be made to the metadata of teams and/or projects, including adding new users to a roster of a team, or removing existing users from the roster of a team. If such a change occurs, then, at step 455, processing can trigger the performance of step 460, at which point the metadata of the team is modified to accommodate the new users, or remove existing users. Processing can then return to step 430 where sandboxes can be created for new users, or deleted for removed users. The remaining steps 435 through 450 can then, again, be performed. As indicated previously, step 455 can be triggered upon the detection of, for example, new users being added to a team, for step 455 can be executed on a predetermined schedule, or at a predetermined time, such as ten minutes prior to the start of a presentation. If no changes are made to the metadata of a team or a project, such as would be determined at step 455, the relevant processing can then end at step 465.

Figure 5:
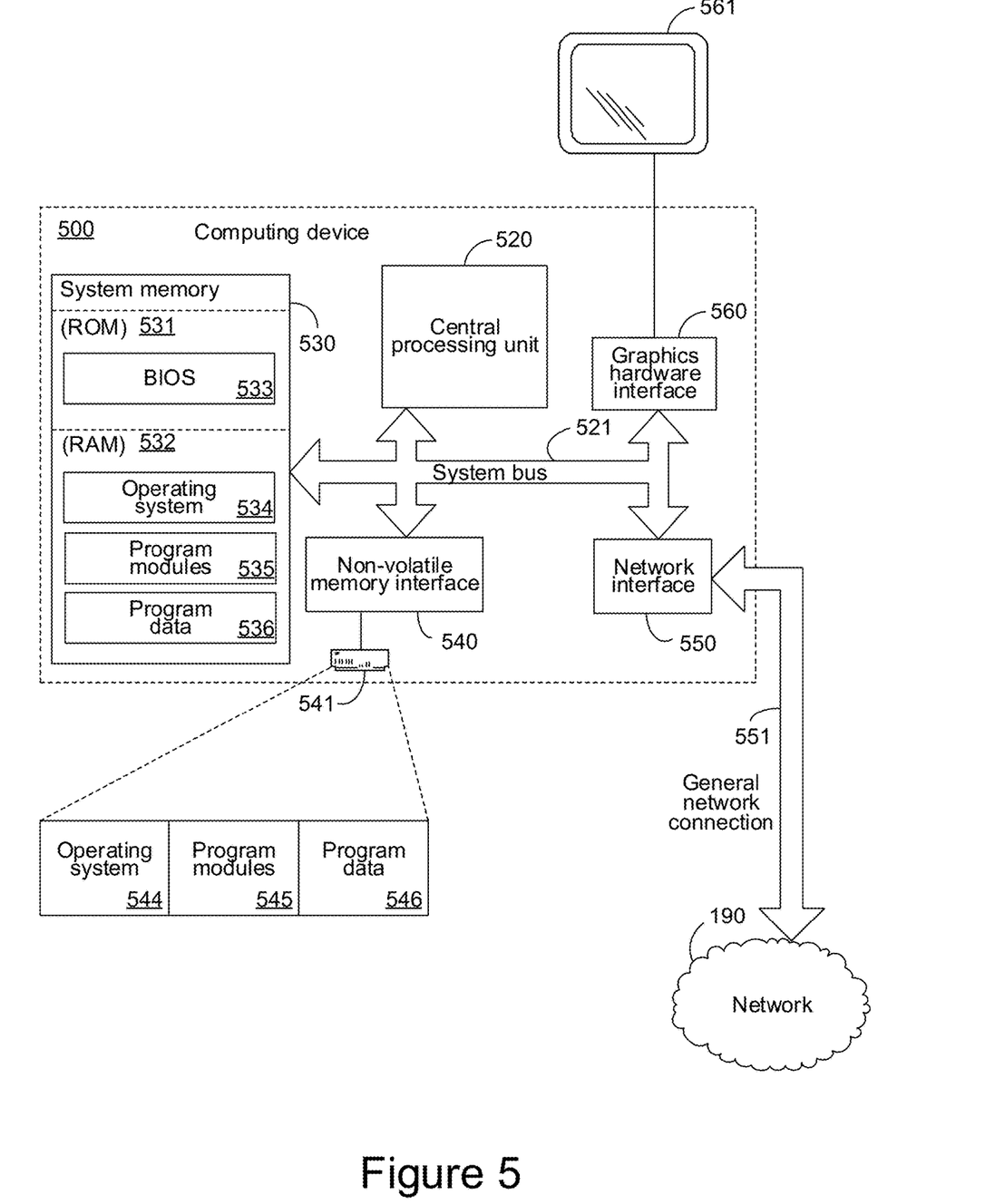
FIG. 5 is a block diagram of an exemplary computing device.

Turning to FIG. 5, an exemplary computing device 500 is illustrated which can perform some or all of the mechanisms and actions described above. The exemplary computing device 500 can include, but is not limited to, one or more central processing units (CPUs) 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. The computing device 500 can optionally include graphics hardware, including, but not limited to, a graphics hardware interface 560 and a display device 561, which can include display devices capable of receiving touch-based user input, such as a touch-sensitive, or multi-touch capable, display device. Depending on the specific physical implementation, one or more of the CPUs 520, the system memory 530 and other components of the computing device 500 can be physically co-located, such as on a single chip. In such a case, some or all of the system bus 521 can be nothing more than silicon pathways within a single chip structure and its illustration in FIG. 5 can be nothing more than notational convenience for the purpose of illustration.

The computing device 500 also typically includes computer readable media, which can include any available media that can be accessed by computing device 500 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 500. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer content between elements within computing device 500, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, other program modules 535, and program data 536.

The computing device 500 may also include other removable/non-removable, volatile/nonvolatile computer storage media. By way of example only, FIG. 5 illustrates a hard disk drive 541 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 541 is typically connected to the system bus 521 through a non-volatile memory interface such as interface 540.

The drives and their associated computer storage media discussed above and illustrated in FIG. 5, provide storage of computer readable instructions, data structures, program modules and other data for the computing device 500. In FIG. 5, for example, hard disk drive 541 is illustrated as storing operating system 544, other program modules 545, and program data 546. Note that these components can either be the same as or different from operating system 534, other program modules 535 and program data 536. Operating system 544, other program modules 545 and program data 546 are given different numbers hereto illustrate that, at a minimum, they are different copies.

The computing device 500 may operate in a networked environment using logical connections to one or more remote computers. The computing device 500 is illustrated as being connected to the general network connection 551 (to the network 190) through a network interface or adapter 550, which is, in turn, connected to the system bus 521. In a networked environment, program modules depicted relative to the computing device 500, or portions or peripherals thereof, may be stored in the memory of one or more other computing devices that are communicatively coupled to the computing device 500 through the general network connection 561. It will be appreciated that the network connections shown are exemplary and other means of establishing a communications link between computing devices may be used.

Although described as a single physical device, the exemplary computing device 500 can be a virtual computing device, in which case the functionality of the above-described physical components, such as the CPU 520, the system memory 530, the network interface 540, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 500 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example a method for generating a set of multiple virtual computing environments and allocating compute resources among the set of multiple virtual computing environments, the method comprising: generating a first set of multiple virtual computing environments, wherein each virtual computing environment comprises emulation of computing hardware specified by a first template; providing, to each member of a team that is enumerated by the team roster, user access to a unique virtual computing environment of the first set of multiple virtual computing environments; providing administrator access to each virtual computing environment, of the first set of multiple virtual computing environments, to a first administrator; linking each virtual computing environment, of the first set of multiple virtual computing environments, to a first project associated with a first project metadata that comprises the first template; linking the first project to a team associated with team metadata that comprises the team roster; allocating, to each virtual computing environment, of the first set of multiple virtual computing environments, an initial allocation of compute resources, wherein emulated computing, by a virtual computing environment, consumes compute resources allocated to the virtual computing environment; determining, after the generating the first set of multiple virtual computing environments, that one or more newly added members have been added to the team roster; providing, to each of the one or more newly added members, user access to a unique virtual computing environment; and allocating the initial allocation of compute resources to each virtual computing environment provided to the each of the one or more newly added members.

A second example is the method of the first example, further comprising: generating, after the determining, a second set of multiple virtual computing environments, wherein each virtual computing environment comprises emulation of computing hardware specified by the first template; wherein the unique virtual computing environments provided to the each of the one or more newly added members are from the second set of multiple virtual computing environments.

A third example is the method of the first example, wherein the unique virtual computing environments provided to the each of the one or more newly added members are from the first set of multiple virtual computing environments.

A fourth example is the method of the first example, wherein the generating the first set of multiple virtual computing environments and the providing the user access to the unique virtual computing environment of the first set of multiple virtual computing environments comprises: generating each virtual computing environment, of the first set of multiple virtual computing environments, within a unique sandbox assigned to the each member of the team that is enumerated by the team roster.

A fifth example is the method of the first example, wherein the generating the first set of multiple virtual computing environments comprises generating the first set of multiple virtual computing environments within a holding sandbox assigned to the first administrator; and wherein further the providing the user access to the unique virtual computing environment of the first set of multiple virtual computing environments comprises re-associating individual virtual computing environments, of the first set of multiple virtual computing environments, from the holding sandbox to a unique sandbox assigned to the each member of the team that is enumerated by the team roster.

A sixth example is the method of the fifth example, wherein the providing, to the each of the one or more newly added members, the user access to the unique virtual computing environment also comprises re-associating other individual virtual computing environments, of the first set of multiple virtual computing environments, from the holding sandbox to a unique sandbox assigned to the each of the one or more newly added members.

A seventh example is the method of the first example, further comprising: receiving a unique identifier from a new user; and modifying the team metadata to update the team roster to now comprise the new user, the modifying being triggered by the receiving of the unique identifier from the new user.

An eighth example is the method of the first example, further comprising: monitoring, for each virtual computing environment, in the first set of multiple virtual computing environments, consumption of the first initial allocation of compute resources; and generating a notification to the first administrator if the monitored consumption of the first initial allocation of compute resources is above a threshold.

A ninth example is the method of the first example, further comprising: preventing a first virtual computing environment, of the first set of multiple virtual computing environments, from performing further emulated computing, if the first virtual computing environment has consumed all compute resources previously allocated to the first virtual computing environment.

A tenth example is the method of the first example, further comprising: preventing a first virtual computing environment, of the first set of multiple virtual computing environments, from performing further emulated computing, if the first virtual computing environment is consuming compute resources previously allocated to the first virtual computing environment faster than a threshold rate, even though the compute resources previously allocated to the first virtual computing environment have not been all consumed.

An eleventh example is the method of the first example, further comprising: presenting, to the first administrator, multiple templates; receiving a selection of the first template from the multiple templates; and modifying the first project metadata to comprise the first template based on the selection.

A twelfth example is the method of the first example, further comprising: receiving, from the first administrator, a first resource consumption limit; and preventing a first virtual computing environment, of the first set of multiple virtual computing environments, from performing further emulated computing, if the first virtual computing environment's consumption of compute resources previously allocated to the first virtual computing environment exceeds the first resource consumption limit, even though the compute resources previously allocated to the first virtual computing environment have not been all consumed.

A thirteenth example is the method of the first example, wherein the initial allocation of the compute resources is a same allocation for each virtual computing environment in both the first set of multiple virtual computing environments and in the virtual computing environments provided to the each of the one or more newly added members.

A fourteenth example is a set of computing devices in aggregate comprising: processing units; and one or more computer-readable storage media comprising computer-executable instructions, which, when executed by at least some of the processing units, cause at least some of the set of computing devices to: generate a first set of multiple virtual computing environments, wherein each virtual computing environment comprises emulation of computing hardware specified by a first template; provide, to each member of a team that is enumerated by the team roster, user access to a unique virtual computing environment of the first set of multiple virtual computing environments; provide administrator access to each virtual computing environment, of the first set of multiple virtual computing environments, to a first administrator; link each virtual computing environment, of the first set of multiple virtual computing environments, to a first project associated with a first project metadata that comprises the first template; link the first project to a team associated with team metadata that comprises the team roster; allocate, to each virtual computing environment, of the first set of multiple virtual computing environments, an initial allocation of compute resources, wherein emulated computing, by a virtual computing environment, consumes compute resources allocated to the virtual computing environment; determine, after the generating the first set of multiple virtual computing environments, that one or more newly added members have been added to the team roster; provide, to each of the one or more newly added members, user access to a unique virtual computing environment; and allocate the initial allocation of compute resources to each virtual computing environment provided to the each of the one or more newly added members.

A fifteenth example is the set of computing devices of the fourteenth example, wherein the one or more computer-readable storage media comprise further computer-executable instructions, which, when executed by at least some of the processing units, cause at least some of the set of computing devices to further: generate, after the determining, a second set of multiple virtual computing environments, wherein each virtual computing environment comprises emulation of computing hardware specified by the first template; wherein the unique virtual computing environments provided to the each of the one or more newly added members are from the second set of multiple virtual computing environments.

A sixteenth example is the set of computing devices of the fourteenth example, wherein the unique virtual computing environments provided to the each of the one or more newly added members are from the first set of multiple virtual computing environments.

A seventeenth example is the set of computing devices of the fourteenth example, wherein the computer-executable instructions causing the generating the first set of multiple virtual computing environments and the providing the user access to the unique virtual computing environment of the first set of multiple virtual computing environments comprise computer-executable instructions, which, when executed by at least some of the processing units, cause at least some of the set of computing devices to: generate each virtual computing environment, of the first set of multiple virtual computing environments, within a unique sandbox assigned to the each member of the team that is enumerated by the team roster.

An eighteenth example is the set of computing devices of the fourteenth example, wherein the computer-executable instructions causing the generating the first set of multiple virtual computing environments and the providing the user access to the unique virtual computing environment of the first set of multiple virtual computing environments comprise computer-executable instructions, which, when executed by at least some of the processing units, cause at least some of the set of computing devices to: generate each virtual computing environment, of the first set of multiple virtual computing environments, within a unique sandbox assigned to the each member of the team that is enumerated by the team roster.

A nineteenth example is the set of computing devices of the fourteenth example, wherein the one or more computer-readable storage media comprise further computer-executable instructions, which, when executed by at least some of the processing units, cause at least some of the set of computing devices to further: receive a unique identifier from a new user; and modify the team metadata to update the team roster to now comprise the new user, the modifying being triggered by the receiving of the unique identifier from the new user.

A twentieth example is one or more computer-readable storage media comprising computer-executable instructions, which, when executed by a computing device, cause the computing device to: generate a first set of multiple virtual computing environments, wherein each virtual computing environment comprises emulation of computing hardware specified by a first template; provide, to each member of a team that is enumerated by the team roster, user access to a unique virtual computing environment of the first set of multiple virtual computing environments; provide administrator access to each virtual computing environment, of the first set of multiple virtual computing environments, to a first administrator; link each virtual computing environment, of the first set of multiple virtual computing environments, to a first project associated with a first project metadata that comprises the first template; link the first project to a team associated with team metadata that comprises the team roster; allocate, to each virtual computing environment, of the first set of multiple virtual computing environments, an initial allocation of compute resources, wherein emulated computing, by a virtual computing environment, consumes compute resources allocated to the virtual computing environment; determine, after the generating the first set of multiple virtual computing environments, that one or more newly added members have been added to the team roster; provide, to each of the one or more newly added members, user access to a unique virtual computing environment; and allocate the initial allocation of compute resources to each virtual computing environment provided to the each of the one or more newly added members.

As can be seen from the above descriptions, mechanisms for scalably generating and provision computing environments have been presented. In view of the many possible variations of the subject matter described herein, we claim as our invention all such embodiments as may come within the scope of the following claims and equivalents thereto.

We claim:

1. A method for generating a set of multiple virtual computing environments and allocating compute resources among the set of multiple virtual computing environments, the method comprising:
    receiving a first input comprising: a team definition comprising an original team roster, and a first project definition comprising a first template;
    automatically generating, based on the first input, a first set of multiple virtual computing environments, wherein each virtual computing environment comprises emulation of computing hardware specified by the first template;
    automatically creating, based on the first input, administrator access for a first administrator to each virtual computing environment of the first set of multiple virtual computing environments;
    automatically linking each virtual computing environment, of the first set of multiple virtual computing environments, to a first project associated with the first project definition;
    automatically linking the first project to a team defined by the team definition;
    automatically allocating, to each virtual computing environment, of the first set of multiple virtual computing environments, an initial, pre-determined allocation of compute resources, wherein emulated computing, by a virtual computing environment, consumes compute resources allocated to the virtual computing environment;
    receiving, after the generating the first set of multiple virtual computing environments, a second input associated with an updated team definition comprising an updated team roster;
    determining, after the generating the first set of multiple virtual computing environments, that the updated team roster comprises one or more newly added members that were not part of the original team roster; and
    automatically providing, to each of the one or more newly added members, user access to a unique virtual computing environment from among a second subset of the first set of multiple virtual computing environments that were previously generated, the second subset comprising virtual computing environments that were not previously assigned to members of the original team roster.

2. The method of claim 1, wherein the automatically generating the first set of multiple virtual computing environments comprises:
    generating each virtual computing environment, of a first subset of the first set of multiple virtual computing environments, within a unique sandbox assigned to each member of the original team roster.

3. The method of claim 2, further comprising:
    automatically providing, to the each member of the original team roster, prior to the receiving the second input, user access to the unique virtual computing environment from among the first subset of the first set of multiple virtual computing environments, the automatically providing being performed by the generating the each virtual computing environment of the first subset of the first set of multiple computing environments within the unique sandbox assigned to the each member of the original team roster.

4. The method of claim 1, wherein the automatically generating the first set of multiple virtual computing environments comprises generating the second subset of the first set of multiple virtual computing environments within a holding sandbox assigned to the first administrator; and
    wherein further the automatically providing the user access to the unique virtual computing environment of the second subset of the first set of multiple virtual computing environments to the one or more newly added members comprises re-associating individual virtual computing environments, of the second subset of the first set of multiple virtual computing environments, from the holding sandbox to a unique sandbox assigned to the one or more newly added members.

5. The method of claim 4, wherein the initial, pre-determined allocation of compute resources allocated to the first subset of the first set of multiple virtual computing environments differs from the initial, pre-determined allocation of compute resources allocated to the second subset of the first set of multiple virtual computing environments.

6. The method of claim 1, wherein the receiving the second input comprises:
    receiving a unique identifier from a new user; and
    automatically generating the updated team definition by modifying the team definition to update the original team roster to now comprise the new user.

7. The method of claim 1, further comprising:
    monitoring, for each virtual computing environment, in the first set of multiple virtual computing environments, consumption of the initial, pre-determined allocation of compute resources; and
    generating a notification to the first administrator if the monitored consumption is above a threshold.

8. The method of claim 1, further comprising:
    preventing a first virtual computing environment, of the first set of multiple virtual computing environments, from performing further emulated computing, if the first virtual computing environment has consumed all compute resources previously allocated to the first virtual computing environment.

9. The method of claim 1, further comprising:
    preventing a first virtual computing environment, of the first set of multiple virtual computing environments, from performing further emulated computing, if the first virtual computing environment is consuming compute resources previously allocated to the first virtual computing environment faster than a threshold rate, even though the compute resources previously allocated to the first virtual computing environment have not been all consumed.

10. The method of claim 1, wherein the automatically generating the first set of multiple virtual computing environments comprises automatically triggering an automatic generating of a first virtual computing environment, of the first set of multiple computing environments, based upon an acceptance by a first user of an invite.

11. The method of claim 1, further comprising:
    receiving, from the first administrator, a first resource consumption limit; and
    preventing a first virtual computing environment, of the first set of multiple virtual computing environments, from performing further emulated computing, if the first virtual computing environment's consumption of compute resources previously allocated to the first virtual computing environment exceeds the first resource consumption limit, even though the compute resources previously allocated to the first virtual computing environment have not been all consumed.

12. A set of computing devices in aggregate comprising:
central processing units (CPUs); and
one or more computer-readable storage media comprising computer-executable instructions, which, when executed by at least some of the processing units, cause at least some of the set of computing devices to:
receive a first input comprising: a team definition comprising an original team roster, and a first project definition comprising a first template;
automatically generate, based on the first input, a first set of multiple virtual computing environments, wherein each virtual computing environment comprises emulation of computing hardware specified by the first template;
automatically create, based on the first input, provide administrator access for a first administrator to each virtual computing environment, of the first set of multiple virtual computing environments;
automatically link each virtual computing environment, of the first set of multiple virtual computing environments, to a first project associated with the first project definition;
automatically link the first project to a team defined by the team definition;
automatically allocate, to each virtual computing environment, of the first set of multiple virtual computing environments, an initial, pre-determined allocation of compute resources, wherein emulated computing, by a virtual computing environment, consumes compute resources allocated to the virtual computing environment;
receive, after the generating the first set of multiple virtual computing environments, a second input associated with an updated team definition comprising an updated team roster;
determine, after the generating the first set of multiple virtual computing environments, that the updated team roster comprises one or more newly added members that were not part of the original team roster; and
automatically provide, to each of the one or more newly added members, user access to a unique virtual computing environment from among a second subset of the first set of multiple virtual computing environments that were previously generated, the second subset comprising virtual computing environments that were not previously assigned to members of the original team roster.

13. The set of computing devices of claim 12, wherein the computer-executable instructions causing the automatic generating of the first set of multiple virtual computing environments comprise computer-executable instructions, which, when executed by at least some of the CPUs, cause at least some of the set of computing devices to:
generate each virtual computing environment, of a first subset of the first set of multiple virtual computing environments, within a unique sandbox assigned to each member of the original team roster.

14. The set of computing devices of claim 13, wherein the one or more computer-readable storage media comprise further computer-executable instructions, which, when executed by at least some of the processing units, cause at least some of the set of computing devices to:
automatically provide, to the each member of the original team roster, prior to the receiving the second input, user access to the unique virtual computing environment from among the first subset of the first set of multiple virtual computing environments, the automatic providing being performed by the generating the each virtual computing environment of the first subset of the first set of multiple computing environments within the unique sandbox assigned to the each member of the original team roster.

15. The set of computing devices of claim 12, wherein the computer-executable instructions causing the generating the first set of multiple virtual computing environments comprise computer-executable instructions, which, when executed by at least some of the processing units, cause at least some of the set of computing devices to:
generate the second subset of the first set of multiple virtual computing environments within a holding sandbox assigned to the first administrator; and
wherein further the automatically providing the user access to the unique virtual computing environment of the second subset of the first set of multiple virtual computing environments to the one or more newly added members comprises re-associating individual virtual computing environments, of the second subset of the first set of multiple virtual computing environments, from the holding sandbox to a unique sandbox assigned to the one or more newly added members.

16. The set of computing devices of claim 15, wherein the initial, pre-determined allocation of compute resources allocated to the first subset of the first set of multiple virtual computing environments differs from the initial, pre-determined allocation of compute resources allocated to the second subset of the first set of multiple virtual computing environments.

17. The set of computing devices of claim 12, wherein the computer-executable instructions that cause at least some of the set of computing devices to receive the second input comprise further computer-executable instructions, which, when executed by at least some of the CPUs, cause at least some of the set of computing devices to further:
receive a unique identifier from a new user; and
automatically generate the updated team definition by modifying the team definition to update the original team roster to now comprise the new user.

18. The set of computing devices of claim 12, wherein the computer-executable instructions causing the automatic generating of the first set of multiple virtual computing environments, comprise computer-executable instructions, which, when executed by at least some of the CPUs, cause at least some of the set of computing devices to: automatically trigger an automatic generating of a first virtual computing environment, of the first set of multiple computing environments, based upon an acceptance by a first user of an invite.

19. The set of computing devices of claim 12, wherein the one or more computer-readable storage media comprise further computer-executable instructions, which, when executed by at least some of the processing units, cause at least some of the set of computing devices to:
receive, from the first administrator, a first resource consumption limit; and
prevent a first virtual computing environment, of the first set of multiple virtual computing environments, from performing further emulated computing, if the first virtual computing environment's consumption of compute resources previously allocated to the first virtual computing environment exceeds the first resource consumption limit, even though the compute resources previously allocated to the first virtual computing environment have not been all consumed.

20. One or more computer storage media comprising computer-executable instructions, which, when executed by a computing device, cause the computing device to:
receive a first input comprising: a team definition comprising an original team roster, and a first project definition comprising a first template;
automatically generate, based on the first input, a first set of multiple virtual computing environments, wherein each virtual computing environment comprises emulation of computing hardware specified by the first template;
automatically creating, based on the first input, administrator access for a first administrator to each virtual computing environment of the first set of multiple virtual computing environments;
automatically link each virtual computing environment, of the first set of multiple virtual computing environments, to a first project associated with the first project definition;
automatically link the first project to a team defined by the team definition;
automatically allocate, to each virtual computing environment, of the first set of multiple virtual computing environments, an initial, pre-determined allocation of compute resources, wherein emulated computing, by a virtual computing environment, consumes compute resources allocated to the virtual computing environment;
receive, after the generating the first set of multiple virtual computing environments, a second input associated with an updated team definition comprising an updated team roster;
determine, after the generating the first set of multiple virtual computing environments, that the updated team roster comprises one or more newly added members that were not part of the original team roster; and
automatically provide, to each of the one or more newly added members, user access to a unique virtual computing environment from among a second subset of the first set of multiple virtual computing environments that were previously generated, the second subset comprising virtual computing environments that were not previously assigned to members of the original team roster.

* * * * *